United States Patent [19]

James

[11] 3,836,332

[45] Sept. 17, 1974

[54] DETERMINATION OF VANILMANDELIC ACID IN URINE

[75] Inventor: Gerald E. James, San Mateo, Calif.

[73] Assignee: Oxford Laboratories, Foster City, Calif.

[22] Filed: June 6, 1973

[21] Appl. No.: 367,632

[52] U.S. Cl. ............................. 23/230 B, 252/408
[51] Int. Cl. ...................... G01n 21/20, G01n 33/16
[58] Field of Search ................................... 23/230 B

[56] References Cited
UNITED STATES PATENTS
3,482,942  12/1969  Schneider.......................... 23/230 B

OTHER PUBLICATIONS

Stanley E. Gitlow et al., Am. J. Cardiology, 26(3), 270–9(1970).
"Clinical Diagnosis," I. Davidson et al., eds., 14th Edition, 622–624, W. B. Saunders, Phila., 1969.
"Gradwohl's Clinical Laboratory Methods," S. Frankel et al., eds., Vol. I, 279, 282–3, C. V. Mosby, St. Louis, 1970.

*Primary Examiner*—Morris O. Wolk
*Assistant Examiner*—Sidney Marantz

[57] ABSTRACT

The concentration of vanilmandelic acid in urine is determined by contacting a measured urine sample with an anion exchange resin to adsorb contained vanilmandelic acid, washing residual urine from the resin, desorbing vanilmandelic acid from the resin, diazotizing the desorbed vanilmandelic acid, extracting the diazotized vanilmandelic acid from the diazotization reaction mixture with cyclohexanone, determining the absorbance of about 590 $\mu$ light by the extract and determining vanilmandelic acid content of the extract by comparing the absorbance of the extract with the absorbance of solutions having known contents of vanilmandelic acid.

3 Claims, No Drawings

DETERMINATION OF VANILMANDELIC ACID IN URINE

BACKGROUND OF THE INVENTION

In 1957 Armstrong et al reported that vanilmandelic acid (3-methoxy-4-hydroxymandelic acid) is a major urinary metabolite of the catecholamines and noted that the urinary excretion of vanilmandelic acid is increased in cases of pheochromocytoma. (Armstrong et al 3-methoxy-4-hydroxy-D-mandelic acid, and urinary metabolite of norepinephrine. Biochim. Biophys. Acta 25, 422–423 (1957)). Since this report it has been generally accepted that abnormally high contents of vanilmandelic acid in urine were indicative of pheochromocytoma. Accurate determination of vanilmandelic acid in urine is a difficult undertaking. The problem has been studied extensively and a number of methods for making the determination have been reported. (Vanilmandelic Acid Determinations Second Edition, Beeler et al, Commission on Continuing Education Council on Clinical Chemistry Copyright 1968 American Society of Clinical Pathologists).

In 1960 Gitlow et al described a colorimetric urine test for pheochromocytoma. (Gitlow et al American Journal of Medicine, June 1960, P. 921). Gitlow et al extracted vanilmandelic acid from urine, diazotized the extract, extracted the diazotized vanilmandelic acid with normal amyl alcohol containing a minor amount of ethanolamine and determined the absorbance of 450 and 550 m$\mu$ light by the extract and then determined the vanilmandelic acid content of the sample by comparison with the absorbance of solutions having known contents of vanilmandelic acid which had been subjected to the same procedure. Since the Gitlow et al publication several variations of their method have been published. All of the methods involve preparing a concentrate of vanilmandelic acid from a urine sample, diazotizing the vanilmandelic acid contained in the concentrate, extracting the diazotized vanilmandelic acid with an organic solvent and determining the absorbance of the extract with varying wavelengths of light and then comparing this absorbance with that of solutions having known vanilmandelic acid contents which had been put through the same procedure.

BRIEF DESCRIPTION OF THE INVENTION

Methods of determining vanilmandelic acid in urine by preparing a vanilmandelic acid concentrate from the urine, adding a diazotizing agent to the concentrate, extracting the resultant mixture with an organic solvent and determining the optical density of the extract are improved by using cyclohexanone as the organic solvent and determining optical density with light having a wavelength about 590 millimicrons. For example, urine is added to a column of anion exchange resin under conditions such that the vanilmandelic acid is held by the resin while amines and acids weaker than vanilmandelic acid are washed off. Then vanilmandelic acid plus some other phenolic acids are eluted with sodium chloride. The eluate is buffered to pH 10.0 and the vanilmandelic acid is diazotized with p-nitrodiazonium chloride. The diazo compound is extracted into cyclohexanone and the organic layer is separated and washed with aqueous carbonate to ensure that the diazo compound is in its deep blue, basic form. The absorbance of the organic layer is measured at 590 m$\mu$. The extraction eliminates most of the interferences remaining after the column chromatography or renders their absorbance almost negligible at 590 nm.

DETAILED DESCRIPTION OF THE INVENTION

REAGENTS

1. Acetic Acid, 1M
2. Sodium Chloride, 3.9M
3. Potassium Carbonate/Bicarbonate, 4M, pH 11.5
4. Cyclohexanone
5. p-Nitroaniline in aqueous HCl (p-Nitroaniline 1.66g/L, HCl - 55 ml conc. HCl/L)
6. Solid Sodium Nitrite
7. Vanilmandelic Acid Standard, 50 mg/L (keep refrigerated)
8. Resin Columns

REAGENT PREPARATION

Dissolve the sodium nitrite in deionized water and dilute to 100 ml (keep refrigerated).

SAMPLE PREPARATION

The preferred sample is a 24-hour urine preserved with 10 ml of concentrated HCl. The pH of the urine should be adjusted to between 4 and 8 before proceeding.

COLUMN CHROMATOGRAPHY PROCEDURE

Columns with the funnels attached are needed for two standards, 5 mg/L and 10 mg/L, and a blank, in addition to one per sample.

1. Add 10 ml deionized water to each column.
2. Add the following:
   To the "blank" column — nothing.
   To the 5 mg/L "standard" column — 100 microliters vanilmandelic acid standard.
   To the 10 mg/L "standard" column — 200 microliters vanilmandelic acid standard.
   to each "sample" column — 1 ml urine.
3. After a couple of minutes (time not critical) cut the tips off the columns and allow them to drain (to waste).
4. Add 12 ml acetic acid (1N) to each column and drain (to waste).
5. Add 10 ml deionized water to each column and drain (to waste).
6. Repeat Step 5.
7. Position a test tube which will contain at least 20 ml under each column.
8. Add 10 ml of sodium chloride solution (3.9M) to each column and allow each column to drain into test tubes.

COLORIMETRY PROCEDURE

9. Add 1 ml potassium carbonate/bicarbonate buffer (pH 11.5-11.8) to each tube and mix well.
10. Prepare fresh diazo reagent by mixing:
    One volume p-nitroaniline with two volumes sodium nitrite solution (2 g/L).
    For each test tube 0.2 ml of diazo reagent will be needed. Use within ten minutes.
11. Add 200 microliters of the fresh diazo reagent to each tube and mix well as each addition is made.
12. Wait five minutes and add 5 ml cyclohexanone to each tube and mix the two phases vigorously.
13. Allow the two phases to separate (2–3 minutes), then remove the lower (aqueous) layer.
14. Add 2 ml of the potassium carbonate/bicarbonate buffer (pH 11.5-11.8) to each tube and mix the two phases vigorously.

15. Centrifuge at 1,500 rpm for about 5 minutes to separate the phases and ensure a clear upper phase.

16. Transfer the upper phase to a cuvette which requires about four ml to cover the photometer light path. Take care not to disturb the lower phase.

17. Read the absorbance of the upper phase for each standard and sample vs. the blank at 590 m$\mu$. (Hitachi 124$\mu$v Visible Double Beam spectrophotometer or Bausch & Lomb spectronic 88 are suitable).

CALCULATIONS

Plot absorbance (O.D.) vs. concentration in mg/L for the standards.

Read concentrations of samples in mg/L from the graph.

To report vanilmandelic in mg/24 hours:

mg/L × 24-hour urine volume in liters = mg/24 hours.

NOTES:
1. The washing of the resin in steps 4 and 5 may be done with large volumes of deionized water but the use of a dilute solution of a weak organic acid is preferred, such washing permits quicker and more complete removal of residual urine.
2. The use of the buffer solution in steps 9 and 14 is convenient but adjustment of pH may be made with any alkaline solution.
3. The "blank" at the end of the procedure is generally yellow in color, diazotized vanilmandelic acid in cyclohexanone is blue, vanilmandelic acid concentrations below about 8mg/L appear greenish. Higher vanilmandelic acid concentrations show a definite blue color.
4. The selection of the anion exchange resin is not critical; any strongly basic resin will suffice. Suitable resins include the Type I resins made by Dow Chemical Co., and sold under the trade name Dowex and those made by Diamond Shamrock Co., and sold under the trade name Duolile.

The method for determining vanilmandelic acid described above is fast, accurate and reproducible. The cyclohexanone extract of the diazotized vanilmandelic acid is blue in color. Any high reading of vanilmandelic acid not attended by definite blue color in the cyclohexanone extract is suspect and should be checked. Light at a wavelength about 590 millimicrons gives superior absorbance spectra with cyclohexanone extracts. The method eliminates most interferences remaining after the adsorption step or renders their absorbance negligible at 590 millimicrons.

I claim:

1. In a method for determining the content of vanilmandelic acid in urine by preparing a concentrate of vanilmandelic acid from the urine, diazotizing the vanilmandelic acid contained in the concentrate, extracting the diazotized vanilmandelic acid with an organic solvent and determining the optical density of the extract, the improvement which comprises using cyclohexanone as the organic solvent.

2. The method as defined in claim 1 wherein the optical density is determined using light having a wavelength about 590 millimicrons.

3. The method of determining the quantity of vanilmandelic acid in urine which comprises:
   a. contacting a measured sample of urine having its pH adjusted to a level in the range about 4 to 8 with an anion exchange resin to adsorb contained vanilmandelic acid,
   b. washing the resin to remove residual urine,
   c. contacting the resin with aqueous sodium chloride to desorb vanilmandelic acid and recovering aqueous sodium chloride containing desorbed vanilmandelic acid,
   d. adjusting the pH of the recovered aqueous sodium chloride to a level in the range 9–11,
   e. mixing freshly prepared p-nitrodiazonium chloride with the recovered aqueous sodium chloride,
   f. extracting the mixture obtained in (e) with cyclohexanone,
   g. intimately mixing the cyclohexanone extract with dilute aqueous alkali and recovering the cyclohexanone phase from the mixture,
   h. determining the optical density of the cyclohexanone phase at about 590 m$\mu$,
   i. determining the vanilmandelic acid content of the sample by comparison with the optical density of solutions having known contents of vanilmandelic acid in the range about 5–15 mg/L which have been subjected to steps a-h inclusive.

* * * * *